United States Patent [19]

Hyams

[11] 4,043,685
[45] Aug. 23, 1977

[54] FASTENERS

[75] Inventor: Joseph Edward Hyams, Solihull, England

[73] Assignee: Vic-Tree (Mouldings) Limited, Birmingham, England

[21] Appl. No.: 621,494

[22] Filed: Oct. 10, 1975

[30] Foreign Application Priority Data

Oct. 22, 1974 United Kingdom ............... 45752/74

[51] Int. Cl.² .............................................. F16D 1/00
[52] U.S. Cl. ..................................... 403/19; 301/121; 403/376; 403/326
[58] Field of Search ............... 295/43, 47; 301/1, 124, 301/126, 111, 112, 119, 121, 122, 134, 135, 108 R; 85/5 P, 8.8; 24/221 L, 221 A, 221 R; 403/316, 361, 376, 377, 19, 326

[56] References Cited

U.S. PATENT DOCUMENTS

| 216,524 | 6/1879 | Mason | 295/47 |
| 2,226,098 | 12/1940 | Hedstrom | 301/111 |
| 2,615,759 | 10/1952 | Becker | 301/112 |
| 3,853,416 | 12/1974 | Hanan | 403/361 |

FOREIGN PATENT DOCUMENTS

| 934,359 | 8/1963 | United Kingdom | 403/361 |
| 28,152 of | 1908 | United Kingdom | 301/112 |

Primary Examiner—Robert B. Reeves
Assistant Examiner—H. Grant Skaggs
Attorney, Agent, or Firm—Marshall & Yeasting

[57] ABSTRACT

A fastener for releasably securing a pram wheel to its axle and similar applications includes a groove in the axle and a post extending tangentially of the axle and which is resilient to deflect about its root so that it can snap engage in the groove. The post is carried in a cap secured to the wheel. A pin is located parallel to the axle in the cap to displace the post to enable the parts to be separated when required.

4 Claims, 6 Drawing Figures

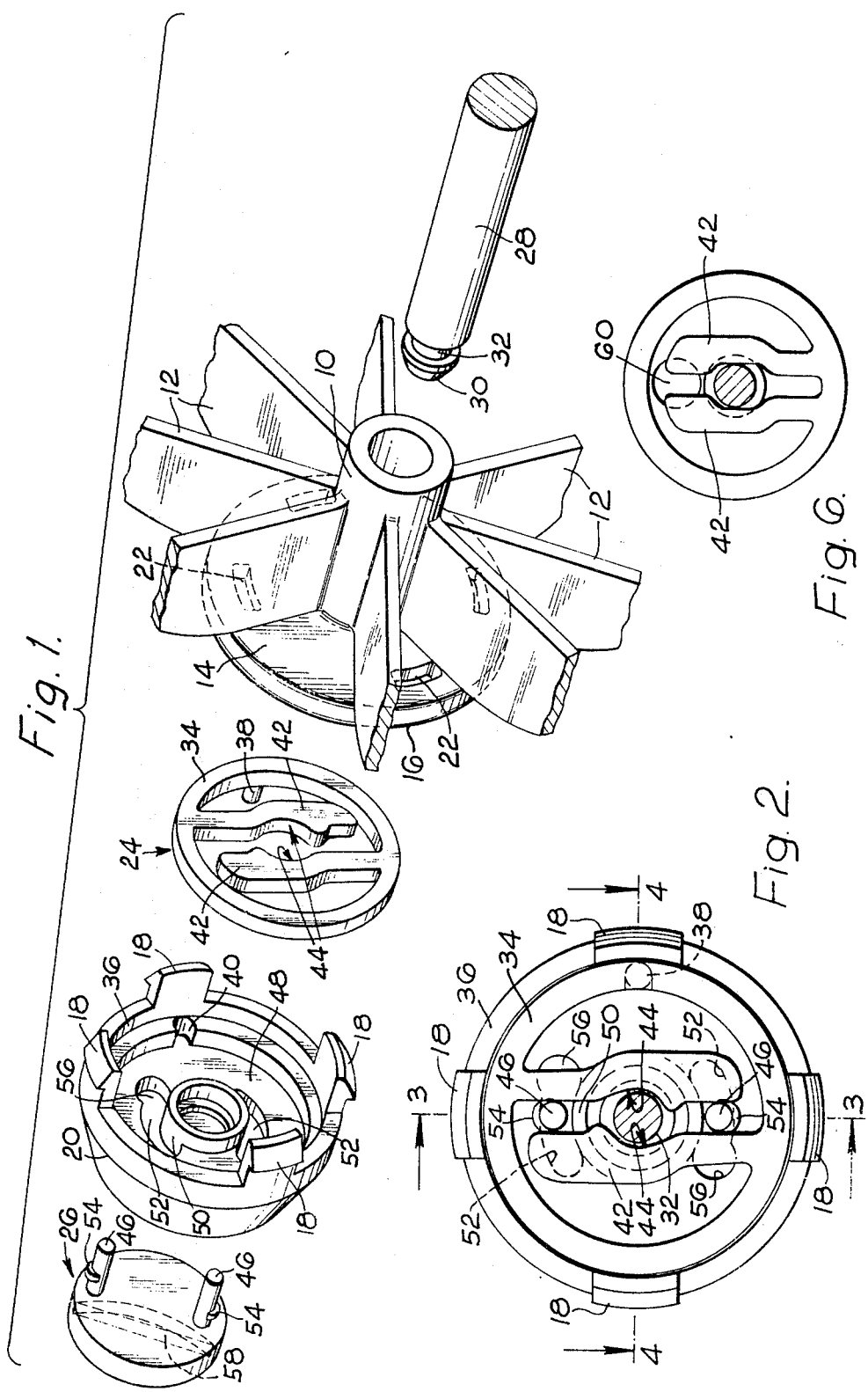

FASTENERS

This invention relates to fasteners comprising two parts which are adapted to be secured together.

SUMMARY OF THE INVENTION

In accordance with the invention a fastener comprises a locking plate and a stud with a lateral recess, the plate including a frame element and at least one post projecting from the frame to extend generally laterally of the stud and engage in the recess when the plate and stud are connected, said post being resilient so that when deflected out of the recess for release or disengagement, it will return to the engaged position.

Preferably a pair of said posts are provided side by side and are arranged to be deflected away from one another for release, the stud including a peripheral groove forming the recess. This feature allows the two parts to be relatively rotatable in the engaged position, when the posts maintain their engagement in the groove but rotate relative to the stud. Hence the one part may be provided on a wheel while the other part forms or is provided on the axle.

Preferably also in the case of rotatable parts, the frame comprises an endless loop located in a cover, the cover being adapted to be fixed to one of the rotatable parts, and the frame and cover being held against relative angular movement of one with respect to the other.

The fastener may be adapted for release by a separate tool, but preferably incorporates release means adapted to be displaced manually, for example by a coin, and to this end a release plate is provided with a number of pegs arranged to deflect the post or posts when the release plate is turned, and in the case when two posts are provided the pegs will be located between the posts, and possibly one on either side of the stud when the posts have their roots (which are connected to the frame) located generally diametrically of the axis of the stud.

BRIEF DESCRIPTION OF THE DRAWINGS

FIG. 1 is an exploded perspective view showing a fragmentary portion of a pram wheel and axle and a securing means therefor;

FIG. 2 is a sectional elevation of the assembly of FIG. 1;

FIG. 6 is a view similar to FIG. 2 of a modification.

DESCRIPTION OF THE PREFERRED EMBODIMENTS

Figure 3:
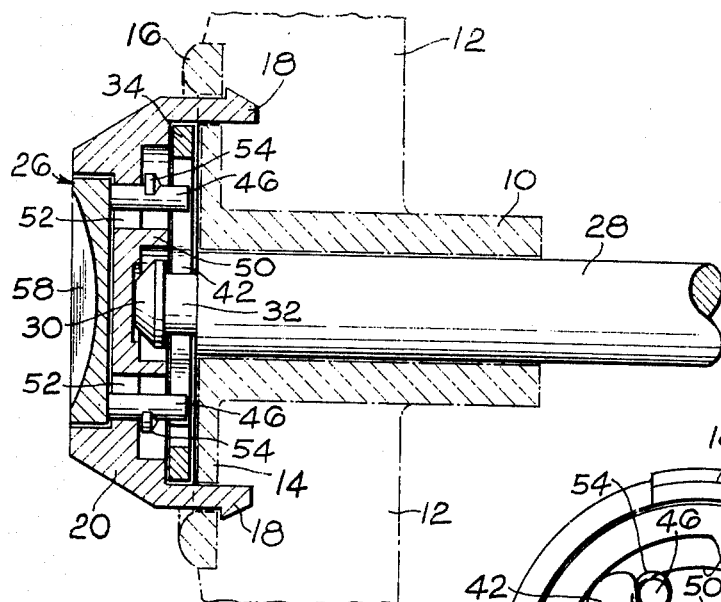
FIGS. 3 and 4 are sections taken on the line 3—3 and 4—4 respectively of FIG. 2.

Turning first to FIGS. 1 to 5 and initially to FIG. 1, the pram wheel comprises a tubular hub 10 with spokes 12 and on its outer face (in use) the hub includes a base member in the form of an annulus 14. The latter has a peripheral bead 16 which serves to confine the rim of a cover member 20 which is snap engaged with the annulus by means of a number of headed prongs 18 passed through slots 22 in the annulus. Located between the cover 20 and the annulus is a locking plate 24 and externally of the cover is a release plate 26. Axle 28 constitutes a stud including a frusto conical end 30 with a peripheral groove or recess 32 behind the same.

The locking plate 24 includes an annular frame 34, see FIG. 2, which is confined within the skirt 36 of the cover (although as an alternative it could seat within the bead 16 and annulus 14) and it is held against rotation by a peg 38 engaged in recess 40 in the cover. Alternatively the cover, which peg constitutes means for holding the plate angularly captive and frame could be non-circular to like effect. Projecting generally chord-wise from the frame is a pair of locking posts 42 each integral with the frame at one end and extending generally parallel to and on opposite sides of a diameter of the frame, and conveniently these have curved edges 44 midway along their length and towards the axis of the frame, the curved edges being located towards one another so as to embrace the periphery of the axle when located between them.

Figure 5:
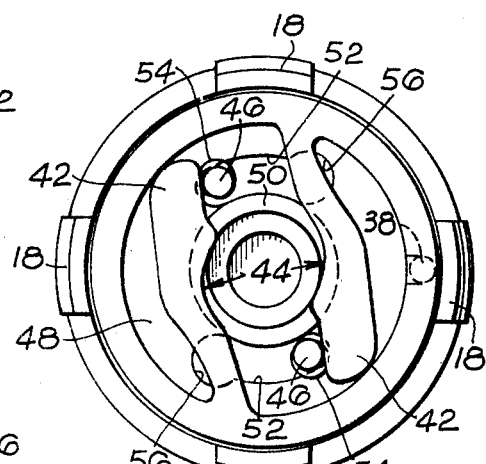
FIG. 5 is a view similar to FIG. 2 showing parts in a "release" condition.
Figure 4:
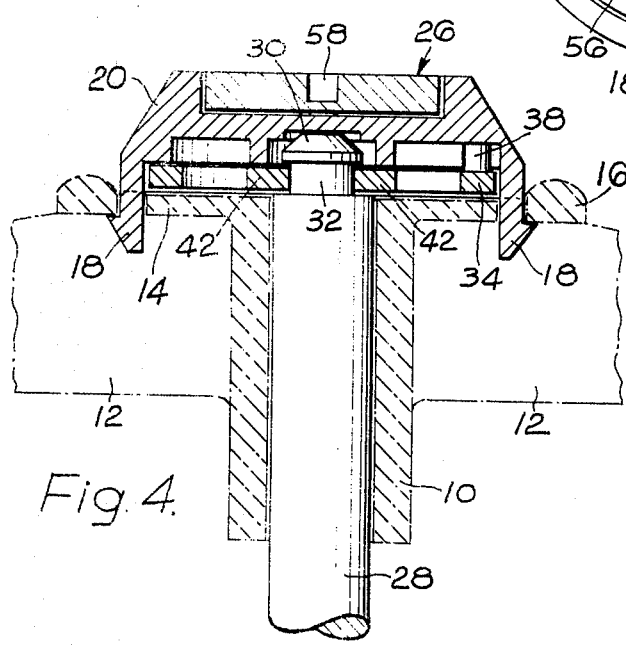

All of the parts 10 to 26 inclusive may be made of suitable synthetic resinous products, thus removing or avoiding problems from corrosion and failures as a result, and in the case of plate 24 one with a suitable resilience to allow the posts 42 to be deflected from the FIG. 2 position to the FIG. 5 position and automatically returned to the FIG. 2 position, as described hereinafter, is an acetal such as the material sold under the Registered Trade Mark DELRIN. However a nylon would also be suitable, and the plate could even be made of metal with suitable dimensions for the cross-section of the posts to give the required deflection and return result, if so required. It will also be appreciated that the other components described could be made of metal if wished.

The release plate 26 comprises a pair of pegs 46 projecting parallel to the axis of the assembly, that is parallel to the axle, and located between the two posts 42. The cover 20 includes an annular portion 48 extending radially outwards from a central sleeve 50 and portion 48 has two arcuate slots 52 therethrough and the pegs project through those slots. Each peg includes a lateral projection 54 and the slots have enlarged ends 56; this arrangement permits the pegs to pass through the enlargements in assembly, and then when the plate 26 is turned, for example via a transverse recess 58 in its outer face and by means of a coin engaged in that recess and used to turn the plate, the projections prevent withdrawal of the pegs through the narrower portion of the slots.

The angular position of the peg 38 and recess 40 relative to the slots 52 is such that in the assembled position, FIG. 2, release pegs 46 are held out of alignment with the enlarged slot portions. Any attempt to turn the release plate clockwise in FIG. 3 is prevented by the locking posts which, in such direction, would be contacted near to their roots where they are stiff and where the leverage is poor. In the opposite direction however, anti-clockwise in FIG. 2, the pegs engage the posts near their free ends with good leverage and in movement of the pegs to the ends of the slots the posts are deflected to the FIG. 5 position where overtravel is prevented by the posts engaging the frame, or by the pegs reaching the ends of the slots. In this preferred embodiment the frame is itself confined by the skirt of the cover.

The release plate and locking plate are assembled to the cover, and the latter to the hub, in the manner described and by virtue of the tapered end of the axle, and the guiding afforded by the tubular hub, the wheel may be offered up to the axle so that the axle enters the hub and is aligned with the centre of the locking plate, and pressed home when the tapered end of the axle will enter between the two posts, spring them apart, and as they recover resiliently they will engage in the groove 32. This will hold the wheel axially captive, and leave it rotationally free. If desired the curvature of the edges 44 may be such as to create a clearance between then and the base of the groove 32, so as to minimise friction in rotation, but the preferred materials have a low coefficient of friction and contact between the posts and the axle is then not important. It will be appreciated that where a part equivalent to the wheel is secured by such a fastener, but rotation is not required, interference between the posts and the walls and base of the groove will be immaterial.

Removal of the wheel is effected simply by turning the release plate and moving the wheel axially. The plate 26 may bear an arrow or other indicia to show the direction in which it should be turned.

It will be understood that the fastener of FIGS. 1 to 5 may be used for other purposes. For example a short stud may be provided as the equivalent to the axle, and the part to be fixed thereto may be a panel or sheet of material with an apertured plate as the equivalent of the hub fixed to that panel or sheet. One instance of such use may be in holding panels in place on machinery, vehicles or aircraft.

Instead of fixing the cover by prongs it may be secured by other means such as adhesives or welding, and when both components (hub or equivalent and cover) are of suitable materials, ultra sonic vibrations may be used to "weld" the parts together.

It will be noted that the fastener described is effectively fail-safe, for in the event of loss of the release plate it is merely release which becomes more difficult and the locking plate remains in place. Even if the cover is lost the locking plate may remain functional. If one post breaks at its root, the other is effective alone, and indeed it is possible or even likely that if both posts were to break they would be constrained between the face of the annulus 14 and the annulus 48 to remain in the plane of the groove 32 and would remain in locking engagement with the groove.

In a modification, not shown, the release plate comprises a push button having a pair of frusto-conical stems located so as to pass between the parts and urge them apart, and the edges of the posts may be bevelled complementarily to give a smooth action.

FIG. 6 shows a view similar to FIG. 2 of a modified version in which the posts have their roots adjacent one another instead of being diametrically opposed. Further, in this embodiment the release plate is omitted and the cover includes an axially offset aperture 60 to admit a screw-driver blade which may be turned angularly to separate the posts for release. This fastener may comprise only a headed stud and the locking plate, and may be adapted for mass production for use for example in holding motor vehicle components in place such as for holding wheel trims to wheels when the studs may be secured to the wheels by adhesive or may be metal components electrically welded to the metal wheels, and the cover plates may be formed by the trims (or secured to them), the apertures 60 being disguised by being ones of a series of apertures forming an ornamental pattern in the trim.

In the case of FIG. 6 or any other arrangement in which the posts extend from adjacent roots, the modification of using a push button to deflect the posts can be employed using only a single frusto-conical or like stem to act on both posts.

Having now described my invention what I claim is:

1. A fastener comprising a locking plate and a stud with a lateral recess, the plate including a frame and at least one post projecting from the frame to extend generally laterally of the stud and engage in the recess when the plate and stud are connected, said post being resilient so that when deflected out of the recess for release or disengagement, it will return to the engaged position; a cover in which the frame is located; a release plate having a number of pegs arranged to deflect the post when the release plate is turned, the release plate being secured to the cover by projections from the pegs; the cover having slots for movement of the pegs, and the slots having enlargements to allow the projections to pass through in assembly, the arrangement being such as to prevent the projections returning to the enlargements in normal use.

2. A fastener assembly comprising a locking plate and a stud provided with a peripheral groove for engagement by the locking plate, the locking plate comprising a peripheral frame and a pair of posts formed integrally with the frame, the whole plate being formed as a plastics molding, each post extending between opposite sides of the frame with one end integral with the frame and the opposite end free to enable the post to be deflected resiliently about its fixed end, said posts lying in the same plane as the peripheral frame and having intermediate portions thereof confronting one another at a spacing less than the lateral dimension of the stud, the lengths of the posts being such that upon insertion of the stud between the posts, the posts are deflected apart substantially into contact with respective sides of said frame, and the thicknesses of said confronting portions of the posts being less than the width of said peripheral groove whereby, when the stud has been inserted to such an extent that its groove is in lateral alignment with said posts, the latter can resiliently restore to positions in which said confronting portions enter the peripheral groove and lock the plate to the stud, said fastener assembly further including a base member and a cover member adapted to be fitted together to form a cavity which receives the locking plate as a snug fit, and means for holding the plate angularly captive within said cavity, the base member having an aperture therein for reception of the stud, the said aperture being in alignment with the space between said confronting portions of the posts, the posts being confined within a space bounded by confronting faces of the cover member and the base member and by the peripheral frame, and having their fixed ends integral with opposite sides of the frame and extending generally parallel to one another, the cover member having two holes therein which are in registry with the space between the posts, and a release plate being provided which has a pair of pegs arranged to extend through said holes in the cover member and between the posts, whereby the posts can be caused to deflect apart by rotation of the release plate.

3. A fastener assembly according to claim 2 in which the release plate is adapted to be turned angularly with respect to the cover member whereby the pegs are effective to deflect the free end of each post away from the fixed end of the other post, turning of the release plate in the opposite sense being resisted by virtue of the rigidity of said fixed ends.

4. A fastener assembly according to claim 2 in which each peg is provided with a lateral projection and in which said holes are in the form of slots extending arcuately about the axis of the stud, each slot being enlarged at one end to allow introduction of the projections on the pegs during assembly of the release plate to the cover member, the projections being arranged to engage behind marginal edges of the narrower parts of said slots and the engagement being such that when the pegs are received between the posts as aforesaid, the pegs are prevented from returning to said enlarged slot portions.

* * * * *